US011782669B2

(12) United States Patent
Pahud et al.

(10) Patent No.: US 11,782,669 B2
(45) Date of Patent: Oct. 10, 2023

(54) INTUITIVE AUGMENTED REALITY COLLABORATION ON VISUAL DATA

(71) Applicant: MICROSOFT TECHNOLOGY LICENSING, LLC, Redmond, WA (US)

(72) Inventors: Michel Pahud, Kirkland, WA (US); Nathalie Riche, Issaquah, WA (US); Eyal Ofek, Redmond, WA (US); Christophe Hurter, Toulouse (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 399 days.

(21) Appl. No.: 15/582,181

(22) Filed: Apr. 28, 2017

(65) Prior Publication Data
US 2018/0314484 A1    Nov. 1, 2018

(51) Int. Cl.
*G06F 3/14*   (2006.01)
*G06F 3/01*   (2006.01)
(Continued)

(52) U.S. Cl.
CPC .......... *G06F 3/1454* (2013.01); *A63F 13/213* (2014.09); *A63F 13/26* (2014.09);
(Continued)

(58) Field of Classification Search
CPC ........ G06F 3/012; G06F 3/011; G06F 3/1454; G06F 3/1423; G06F 3/013; G06F 3/016;
(Continued)

(56) References Cited

U.S. PATENT DOCUMENTS 9,077,647 B2    7/2015   Fein et al.
9,122,321 B2    9/2015   Perez et al.
(Continued)

FOREIGN PATENT DOCUMENTS

CN    103797472 A    5/2014
CN    105739683 A    7/2016
(Continued)

OTHER PUBLICATIONS

Kaufmann, et al., "Multiple Head Mounted Displays in Virtual and Augmented Reality Applications", In International Journal of Virtual Reality, vol. 5, Issue 3, Sep. 2006, pp. 1-8.
(Continued)

*Primary Examiner* — Shaheda A Abdin
(74) *Attorney, Agent, or Firm* — SHOOK, HARDY & BACON L.L.P.

(57) ABSTRACT

Various systems and techniques for intuitively and non-obstructively obtaining awareness of fellow collaborator views and/or statuses in an augmented reality environment are disclosed. An interaction is detected between a first and second HMD, both collaborative participants of a shared dataset represented in an augmented reality environment. The detected interaction can cause the first HMD to request state information associated with the second HMD. The second HMD can process the request in accordance with a privacy policy to generate a set of visual data as a response to the request. The second HMD can communicate the generated set of visual data to the first HMD, such that the first HMD can render the received set of visual data as additional computer-generated object(s) to be displayed concurrently with its own augmented view. The additional computer-generated object(s) can be positioned in accordance with a real-world or virtualized position of the second HMD, such that the now-visible state information associated
(Continued)

with the second HMD does not obstruct a view of the second HMD's user.

19 Claims, 9 Drawing Sheets

(51) Int. Cl.
    *A63F 13/428*     (2014.01)
    *A63F 13/26*     (2014.01)
    *A63F 13/213*     (2014.01)
    *A63F 13/86*     (2014.01)
    *A63F 13/5255*     (2014.01)
    *A63F 13/32*     (2014.01)
    *A63F 13/285*     (2014.01)

(52) U.S. Cl.
    CPC ............ *A63F 13/285* (2014.09); *A63F 13/32* (2014.09); *A63F 13/428* (2014.09); *A63F 13/5255* (2014.09); *A63F 13/86* (2014.09); *G06F 3/011* (2013.01); *G06F 3/012* (2013.01); *G06F 3/013* (2013.01); *G06F 3/016* (2013.01); *G06F 3/1423* (2013.01)

(58) Field of Classification Search
    CPC ................ G06T 19/006; G02B 27/017; G02B 2027/014; G06Q 10/10; A63F 13/86; A63F 13/32; A63F 13/285; A63F 13/213; H04L 51/10; H04L 12/1827
    See application file for complete search history.

(56) References Cited

U.S. PATENT DOCUMENTS

| | | |
|---|---|---|
| 9,215,293 B2 | 12/2015 | Miller |
| 2012/0249416 A1 | 10/2012 | Maciocci et al. |
| 2012/0249741 A1* | 10/2012 | Maciocci ............... G06T 15/503 |
| | | 348/46 |
| 2013/0135180 A1* | 5/2013 | McCulloch ............. G06F 3/012 |
| | | 345/8 |
| 2013/0194304 A1* | 8/2013 | Latta ...................... G09G 3/003 |
| | | 345/633 |
| 2013/0194305 A1* | 8/2013 | Kakuta ................. G06T 19/006 |
| | | 345/633 |
| 2014/0091984 A1 | 4/2014 | Ashbrook et al. |
| 2014/0354685 A1 | 12/2014 | Lazarow et al. |
| 2014/0368537 A1 | 12/2014 | Salter et al. |
| 2015/0049001 A1 | 2/2015 | Rahman et al. |
| 2015/0215351 A1 | 7/2015 | Barzuza et al. |
| 2015/0235622 A1 | 8/2015 | Border et al. |
| 2015/0279106 A1 | 10/2015 | Blanchflower et al. |
| 2016/0027218 A1 | 1/2016 | Salter et al. |
| 2016/0093108 A1 | 3/2016 | Mao et al. |

FOREIGN PATENT DOCUMENTS

| | | |
|---|---|---|
| CN | 106302427 A | 1/2017 |
| CN | 106385587 A | 2/2017 |
| EP | 3110141 A1 | 12/2016 |
| WO | 2013012960 A2 | 1/2013 |
| WO | 2015081334 A1 | 6/2015 |

OTHER PUBLICATIONS

"International Search Report and Written Opinion Issued in PCT Application No. PCT/US2018/028215", dated Sep. 13, 2018, 21 Pages.
"First Office Action and Search Report Issued in Chinese Patent Application No. 201880027741.5", dated Sep. 19, 2022, 11 Pages.
"Office Action Issued in Indian Patent Application No. 201917041243", dated Sep. 17, 2021, 8 Pages.
"Second Office Action Issued in Chinese Patent Application No. 201880027741.5", dated Mar. 28, 2023, 14 Pages.
"Office Action Issued in Chinese Patent Application No. 201880027741.5", dated Jul. 7, 2023, 15 Pages.

* cited by examiner

INTUITIVE AUGMENTED REALITY COLLABORATION ON VISUAL DATA

BACKGROUND

Advancing technologies, such as augmented reality or "mixed" reality, have been incorporated into various facets of society. Industries including gaming, enterprise, design, entertainment, among others, are incorporating these technologies into various product offerings to enhance user experience and productivity. One particular area of productivity enhancement, facilitated by such technologies, relates to collaborative working environments.

Augmented reality is a technology that essentially superimposes a computer-generated image onto a user's real-world view, such that a user of the technology can perceive a composite view including the real-world view overlaid by the computer-generated image. In collaborative environments, augmented reality has enabled users to explore a subject of interest from multiple perspectives within a real-world environment. Typically, this technology is incorporated into a single-user device, such as a computing device coupled to a head-mounted display. In this regard, the composite views are rendered for each user's individual perception through their head-mounted display, based on his or her viewing placement within the environment. In other words, if a computer-generated object was super-imposed inside of a real-world environment (e.g., a room), each user within the environment would perceive the object from a unique perspective, based on his or her position and orientation within the room and/or relative to the computer-generated object. In this way, one user may view the front side of an object, while another user across the room may view the back side of the object. Similarly, a third user may view the left side of the object, while a fourth user across the room may view the right side of the object.

In collaborative situations, however, users generally require the ability to share their contributions with fellow collaborators and, likewise, obtain their fellow collaborators' contributions. The single-user device implementation of augmented reality, however, severely limits collaborating users of intuitively obtaining an awareness of their fellow collaborators' views or statuses.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards facilitating intuitive collaboration on visual data in augmented reality (AR) environments. In other words, embodiments can facilitate intuitive techniques for sharing views and/or statuses between collaborating AR users. While the present disclosure primarily references AR as the embodied technology, other technologies such as mixed reality, holography, and virtual reality, are technologies that remain within the purview of the present disclosure.

In some embodiments, at least a first and second head-mounted display (HMD), each having access to a shared dataset as collaborative participants, can access the shared dataset. The shared dataset can be accessed by each of the HMDs to render a computer-generated view, or an "augmented view" (e.g., a computer-generated object super-imposed over a user's real-world view), that is perceivable to the user wearing the respective HMD. Each augmented view can be rendered based on a set of visual data from the shared dataset. In some further embodiments, each augmented view can be rendered on respective HMDs in accordance with detected viewing placements thereof. In other words, each user can perceive a unique perspective of a super-imposed computer-generated object based on the user's detected viewing position and orientation relative to a rendering position of the computer-generated object. While embodiments of the present disclosure are described in context of an at least partially rendered augmented view, it is contemplated that a fully-computer generated view is also within the purview of embodiments described herein.

In some embodiments, a first HMD, as a first collaborative participant of a shared dataset, can initialize and/or detect an interaction that is directed to a second HMD that is a second collaborative participant of the shared dataset. In various embodiments, the interaction can be detected based on one or more user input(s) facilitated by one or more viewing placement sensors associated with the first and/or second HMD(s). In some embodiments, the interaction can be detected based on the respective viewing placements of the first and second HMDs. For instance, a first user of the first HMD may direct their gaze at the second user, at the face of the second user, at the second HMD, or in the likes thereof (e.g., in alignment therewith), such that the viewing sensors of the first HMD can determine the position at which the first user's gaze is being directed. The first HMD may then determine, based on an obtained position of the second HMD, that the first user's gaze is directed to the second user or the likes thereof. In this way, and by way of example only, the first HMD can detect the interaction directed to the second HMD.

In some embodiments, after detecting the interaction, the first HMD can communicate, to the second HMD, a request to receive a set of visual data that corresponds to a state of the second HMD. In various embodiments, the state can include: an augmented view that is currently rendered, provided for display, and/or displayed (together referred to hereinafter as "current augmented view") by the second HMD; a status of the augmented view (e.g., zoom level, position, orientation, depth, angle); a status associated with the second HMD; a stored copy of any of the foregoing; descriptive notes that semantically describe any of the foregoing (hereinafter referred to as "descriptive notes"); or any combination thereof.

In some embodiments, the second HMD can receive the request from the first HMD, based on the first HMD's interaction directed to the second HMD. The second HMD can process various tasks before responding to the first HMD. By way of example only, the second HMD may verify that the first HMD is a collaborative participant of the shared dataset. The second HMD may also determine various privileges and/or restrictions that are associated with the requesting first HMD. For instance, a privacy policy associated with the second HMD may dictate the amount and/or types of state information that can be communicated to the first HMD in response to the received request. In this regard, in some embodiments, the second HMD can communicate, responsive to the request from the first HMD, at least a portion of the set of AR data that corresponds to state of the second HMD. By way of example only, the second HMD may communicate any portion of its current augmented view, a status of the current augmented view, a status of the device itself (e.g., battery level, applications being executed, media being consumed, user availability, and the like), a stored copy of any of the foregoing, descriptive notes semantically describing any of the foregoing, or any combination thereof, in response to the received request and in accordance with a referenced privacy policy.

In some embodiments, the first HMD can receive, from the second HMD, the communicated set or at least the communicated portion of the set of visual data. The first HMD can then render, provide for display, and/or display at least the received portion of the set of visual data as computer-generated object(s) to be perceived by the user thereof. In some further embodiments, the first HMD can render, provide for display, and/or display a new computer-generated object and/or an augmentation to their augmented view in a position that is perceivable, by the user thereof, as being adjacent (e.g., above, beside, underneath, diagonal, offset) to the second user or the likes thereof, such that the new object or addition is non-obstructive to the first user's visibility and personal engagement with the second user (e.g., the face of the second user). In this way, collaborative AR users can intuitively obtain awareness of their fellow collaborators' views and/or statuses without necessitating clarification and/or interrupting the collaborative workflow.

BRIEF DESCRIPTION OF THE DRAWINGS

Aspects of the present disclosure are described in detail below with reference to the attached drawing figures, wherein.

DETAILED DESCRIPTION

Figure 1:
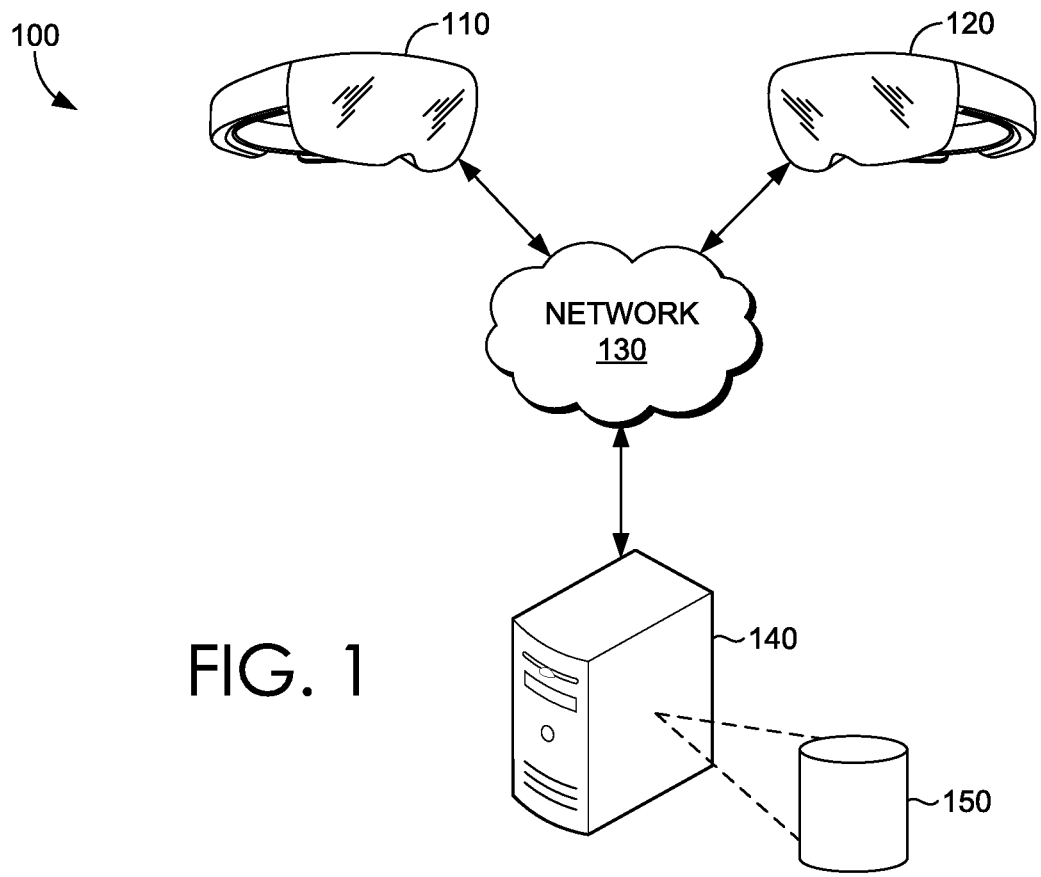
FIG. 1 is a diagram of an example operating environment in accordance with some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Collaborative computing can enable multiple parties to collaborate on electronic documents, graphics, media, video games, and many other forms of digital assets, such that each party to a collaborative computing session can work on and/or experience the digital asset together with the other parties. When incorporated into augmented or "mixed" reality environments, collaborative computing can provide these same benefits, plus a great deal more. Augmented reality, as described herein, is a technology that can employ computing devices to add graphics, sounds, haptic feedback, and/or other sensory inputs to the natural world. Augmented reality is typically implemented in a single-user device, and oftentimes in a head-mounted form-factor, though other form-factors are contemplated in accordance with embodiments described herein. In this regard, the HMD will be referenced herein to encompass head-mounted displays, projectors, eyewear, phones, tablets, and other form-factors that can augment a user's perception of the real world. In augmented reality, a user wearing HMD can view, hear, smell, and/or feel (the foregoing also referenced herein as "perceive") their real-world environment, while also perceiving computer-generated or computer-initiated experiences that seemingly exist within the environment, when in fact, these experiences are merely computer-generated or computer-initiated outputs (e.g., digital overlays, projections, sounds, mechanically released scents, haptic feedback) that augment their real-world perceptions.

When collaborating in an augmented reality environment, multiple users can independently perceive a common computer-generated output, based on their viewing placement relative to a rendering position of the computer-generated output. In accordance with embodiments described herein, a "viewing placement" can be a detected position and/or orientation of a HMD, relative to a point of origin. In various embodiments, the point of origin can be a position of a sensor, a designated position determined by at least one sensor, a position of a computing device, a position of another HMD, a position of a rendered object, a position of a real-world object, or any other real-world or computer-generated object that can be assigned with a coordinate position (e.g., Cartesian coordinates). By way of example, if a computer-generated object is rendered having a position at (0,0), and two "users" with HMDs are perceiving that object in an augmented reality environment, where "User 1" is positioned at (3, 0) and "User 2" is positioned at (−3, 0), the users would perceive opposing sides of the object.

If for whatever reason, "User 2" wanted to perceive the same perspective as "User 1," then "User 2" would merely need to walk over to the same position as "User 1" to view the object with the same or similar perspective as "User 1." In some situations, however, movement about the real-world is not always convenient or practical in collaborative situations. For instance, if a classroom of users is collaborating in an augmented reality environment, and a professor is discussing something that he is seeing in the augmented reality environment, it would be impractical and time-consuming for each user to walk over to the professor's precise location in order to perceive the same or similar view. Likewise, if a student has a question or wants to share their view with other users, it would be impractical for the professor or the other users to walk over to the student in order to see what the student is referencing.

Moreover, various technologies within augmented reality environments can enable users to modify their perceived views. For example, "User 1" may zoom in on a computer-generated object to a particular level of detail. Unfortunately, even if "User 2" physically walked over to the same position as "User 1," who is zoomed-in on the object, "User 2" would not be able to perceive the same view that "User 1" is perceiving. At best, "User 2" would have to verbally request the characteristics (e.g., zoom factor, depth, coordinates) at which "User 1" is perceiving the object, and then modify his own view to precisely match that of "User 1." In collaborative environments, these shortcomings can lead to confusion, interruptions, inefficient communications, and a generally frustrating experience.

In this regard, as collaborative participants are immersed in an augmented reality environment, it would be desirable to access the state of other collaborative participants in an intuitive and non-disruptive manner. As such, aspects of the technology described herein are directed towards sharing and accessing states of collaborative participants in an augmented reality environment. More particularly, embodiments described herein can detect an interaction from a first HMD and a second HMD that are both collaborative participants of a shared dataset represented in an augmented reality environment. The first HMD having a first viewing placement within the environment, can detect an interaction that is directed to a second HMD having a second viewing placement within the environment. The detected interaction can cause the first HMD to request the state of the second HMD. In various embodiments, the state of the second HMD can be represented by a set of visual data that comprises a current augmented view of the second HMD, a status of the current augmented view of the second HMD, a status of the second HMD (e.g., battery level, activity, identifier), a stored copy of any of the foregoing, descriptive notes that semantically describe any of the foregoing (hereinafter referred to as "descriptive notes"), or any combination thereof.

In response to receiving the request, the second HMD can analyze the request in reference to a privacy policy associated with the second HMD. In another embodiment, the request can be communicated by the first HMD to a server or a cloud device, where the request is analyzed in reference to the associated privacy policy thereby. In some embodiments, the privacy policy can be directed to specific HMDs and/or user accounts associated with HMDs. To this end, the privacy policy of the second HMD can be analyzed in conjunction with the request, to determine the extent of state information that can be provided to the first HMD in response to the request. In various embodiments, the policy can set limits, generally, or for specific users and/or their devices, to the types of information that is included in the responsive set of visual data described herein.

After the second HMD prepares the requested set of visual data, or a portion of the requested set as a result of privacy policy compliance, the second HMD can communicate the prepared set of visual data to the first HMD, as a response to the request. The first HMD can then receive the prepared set of visual data from the second HMD, then subsequently render, provide for display, and/or display the received portion or set of visual data to be displayed by the first HMD and perceived by the user thereof. In some embodiments, the first HMD can render, provide for display, and/or display a new computer-generated object or additional object to its existing augmented view, where the new or additional object is based on the received portion or set of visual data. The new or additional object is augmented to the existing augmented view, of the first HMD, in a position that is perceivable, by its user, as being adjacent (e.g., above, beside, underneath, diagonal, offset, overlapping) to the second user and/or the second HMD, such that the new computer-generated object or additional object is non-obstructive to the first user's visibility and personal engagements with the second user (e.g., the face of the second user). In this way, collaborative AR participants can intuitively and non-obstructively obtain awareness of their fellow collaborators' views and/or statuses without necessitating clarification and/or interrupting the collaborative workflow.

It is also contemplated that in some further embodiments, at least the second user and/or at least the second HMD is also a computer-generated object. For instance, certain AR technologies have enabled users in remote locations to "teleport" into environments of other users, such that a user may perceive their fellow collaborator(s) and their respective environment (as computer-generated objects), and meanwhile, in some implementations, their collaborator(s) may perceive the user as a computer-generated object (e.g., an avatar)_within their own environment. As such, the first and/or at least the second users and their respective HMDs and/or environments can be computer-generated objects, and it is contemplated that the inclusion of such implementations are within the purview of the present disclosure. To this end, a remote user (i.e., a collaborative user presented as a computer-generated object) within the first user's environment can still have characteristics and functionalities of a second user within the purview described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes at least two user devices, such as HMDs 110 and 120; a network 130; at least one server 140; and at least one data source 150. It should be understood that environment 100 shown in FIG. 1 is an example of one suitable operating environment. Each of the components shown in FIG. 1 may be implemented via any type of computing device, such as computing device 900 described in connection to FIG. 9, for example. These components may communicate with each other via network 130, which may include, without limitation, one or more local area networks (LANs) and/or wide area networks (WANs). In exemplary implementations, network 130 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 140 may be provided via multiple devices arranged in a distributed environment that collectively provide the functionality described herein. Additionally, other components not shown may also be included within the distributed environment.

User devices 110 and 120 can be client devices on the client-side of operating environment 100, while server 140 can be on the server-side of operating environment 100. Server 140 can comprise server-side software designed to work in conjunction with client-side software on user devices 110 and 120 so as to implement any combination of the features and functionalities discussed in the present disclosure. This division of operating environment 100 is provided to illustrate one example of a suitable environment, and there is no requirement for each implementation that any combination of server 140 and user devices 110 and 120 remain as separate entities. While not shown, in some embodiments, user devices 110 and 120 can be peer devices in a peer-to-peer operating environment.

User devices 110 and 120 may comprise any type of computing device capable of use by a user. For example, in one embodiment, user devices 110 and 120 may be the type of computing device described in relation to FIG. 9 herein. By way of example and not limitation, a user device may be embodied at least in part as a personal computer (PC), a laptop computer, a head-mounted display, a cellular or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, projection system, or any other suitable device that can be coupled to a head-mounted display, projector, eyewear, wearable, or other augmented reality or HMD. One non-limiting example of a HMD is the Microsoft® HoloLens® by Microsoft, Inc., though many other implementations of HMDs or viewing devices are considered within the purview of the present disclosure. For instance, an HMD or viewing device can include a combination of devices, such as a head-mounted display, a touch-screen device, a wearable, internal and/or external sensing device(s), input device(s), output device(s), communication device(s), or any non-limiting combination thereof. Any of the aforementioned devices can be employed and/or combined in tandem to fall within the purview described herein, for facilitating the collection of contextual information associated with a user (e.g., to sense and obtain position, orientation, and/or other physiological measurements).

Data source 150 may comprise data sources and/or data systems, which are configured to make data available to any of the various constituents of operating environment 100, or systems 200, 300, 600 described in connection to FIGS. 2, 3, and 6. For example, in one embodiment, one or more data sources 150 can provide (or make available for access) user data for storage in memory 250 of FIG. 2. Data source 150 may be discrete from user devices 110 and 120 and server 140 or may be incorporated and/or integrated into at least one of such components. In some embodiments, each user device 110, 120 can retrieve a common dataset from the data source 150, such that each user device 110, 120 can independently store and employ the common dataset. In some embodiments, data source 150 may comprise a single dataset, which can be shared amongst multiple user devices, such as user devices 110 and 120. In some embodiments, the shared dataset can be access-controlled by a server, such as server 140. That is, each user device 110, 120 can be associated with a user account, and each user device 110, 120 can communicate a request to the server 140 for access to the shared dataset or a subset thereof. To this end, the server 140 can determine whether each user account has appropriate privileges to access the shared dataset stored in data source 150. In various embodiments, the data source 150 stores a shared dataset that can be interpreted, analyzed, and/or processed by the user devices 110, 120, such that an augmented reality environment, based on the shared dataset, is generated and/or rendered by each user device. In further embodiments, the shared dataset includes visual data that can be interpreted, analyzed, processed, rendered, and/or provided for display by an HMD, such as user devices 110, 120, and/or displayed by the HMD.

Figure 2:
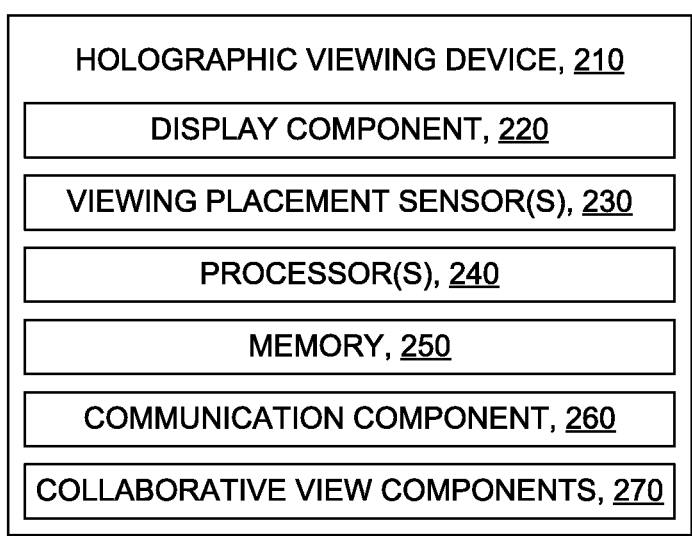
FIG. 2 is a block diagram depicting an exemplary component of computing architecture, in accordance with some embodiments of the present disclosure.
Figure 3:
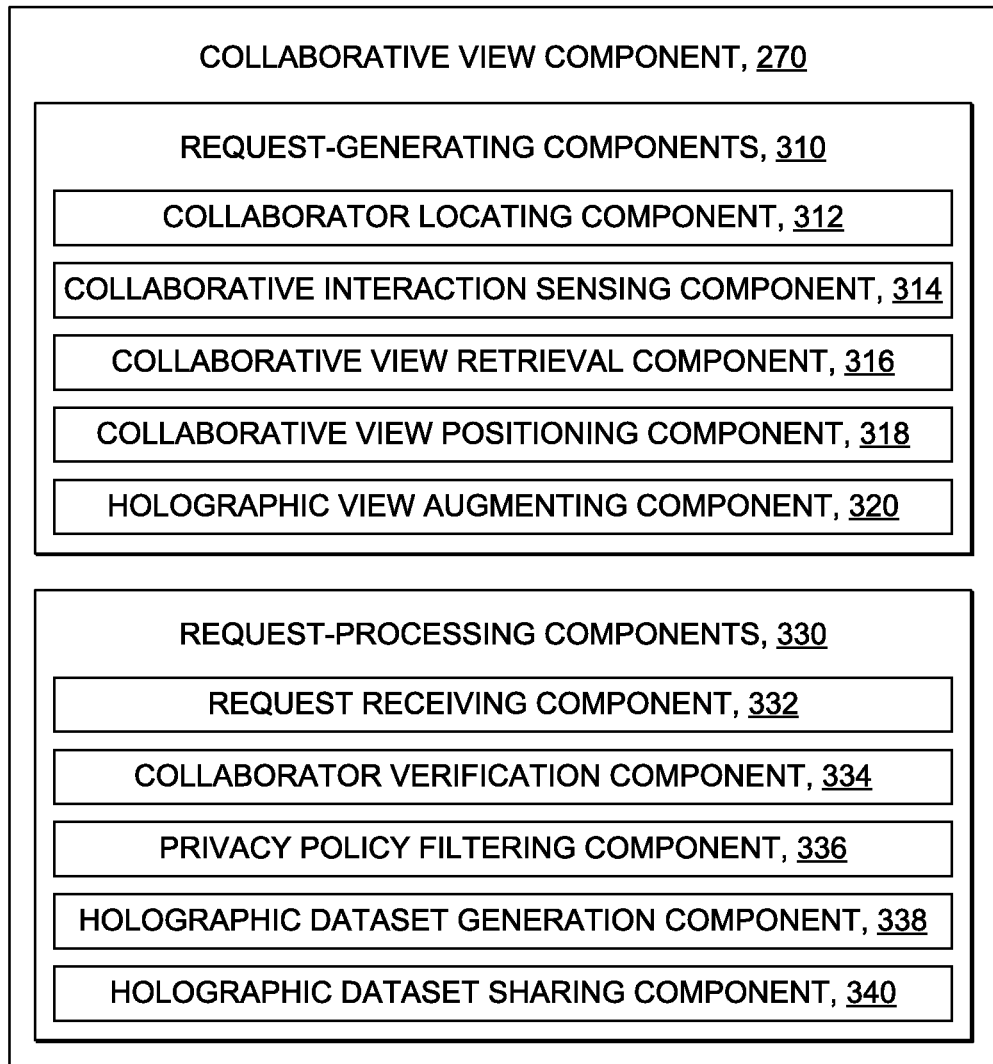
FIG. 3 is a block diagram depicting an exemplary component of computing architecture, in accordance with some embodiments of the present disclosure.

Operating environment 100 can be utilized to implement one or more of the components of system 200, described in FIG. 2, including components for rendering, providing for display, and/or displaying augmented views, detecting or sensing a viewing placement of an HMD, processing computer-executable instructions, storing computer-executable instructions and visual data, communicating with server 140 and/or other HMDs, requesting and receiving collaborative views from other HMDs, and/or processing requests for collaborative views from other HMDs, among other things.

In some embodiments, the functions performed by components of system 200 can be associated with one or more HMD applications, services, or routines. In particular, such applications, services, or routines may operate on one or more user devices (such as user device 110 or 120), servers (such as server 140), and/or components thereof, and/or may be distributed across one or more user devices and servers, or be implemented in the cloud. Moreover, in some embodiments, the components of system 200 may be distributed across a network, including one or more servers (such as server 140) and client devices (such as user device 110, 120), in the cloud, or may reside on a user device, such as user device 110, 120. Moreover, these components, functions performed by these components, or services carried out by these components may be implemented at appropriate abstraction layer(s), such as the operating system layer, application layer, hardware layer, of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, the HMD 210 is an augmented reality or mixed-reality computing device that is generally responsible for sensing or detecting a viewing placement thereof, accessing a shared dataset, rendering at least a portion of the shared dataset based at least in part on the detected viewing placement of the HMD 210, and providing for display an augmented view of the rendered data in accordance with the detected viewing placement. In some embodiments, the HMD 210 includes a communication component 260 that can be employed to communicate with a remote server device, such as server 140 of FIG. 1, to obtain at least a portion of the shared dataset therefrom. In further embodiments, the communication component 260 of the HMD 210 can also be employed to communicate with another HMD (not shown, but similarly configured as HMD 210). As noted herein, the HMD 210 and its components may be implemented as any type of computing device, such as computing device 900 described in connection to FIG. 9, for example.

In some embodiments, the communication component 260 can receive visual data (e.g., a set of visual data) from a shared dataset, that is stored on the server 140 or on another HMD. In further embodiments, the visual data or a subset thereof can be stored locally on a memory or cache, such as memory 250. The HMD 210 can also include at least one viewing placement sensor 230 that can sense or detect a position and/or orientation of the HMD 210. In accordance with some embodiments described herein, a viewing placement sensor 230 can comprise an accelerometer, a gyroscope, a magnetometer, a proximity sensor, an infrared sensor, an infrared blaster, a laser, a radio signal transmitter, or any other hardware component that is necessarily employed to determine a position and/or orientation of an electronic device within a defined real-world environment. In some further embodiments, the HMD 210 can also include a counterpart viewing placement sensor (not shown) that is fixedly positioned remote from the viewing placement sensor 230, and operating in conjunction with the viewing placement sensor(s) to facilitate the detection of a position and/or orientation of the HMD 210. In even further embodiments, one or more sensors can be positioned within the real-world environment operable to determine a respective location and/or gaze of each user therein. To this end, the sensed data (e.g., position, orientation, facing direction) can be communicated to a server and/or each HMD within the environment such that respective locations and gazes of users within the environment can be determined thereon. One non-limiting example of such a sensor can be the Microsoft Kinect® device, by Microsoft, Inc.

In some embodiments, the HMD 210 includes at least one processor, such as processor 240. The processor can include any type of computing processor, including a graphics processor. The processor 240 can be employed by the HMD to perform any of the functions or operations described herein, and can further render for display, visual data obtained by the HMD 210. The HMD 210 can employ a display component, such as display component 220, that can display and/or project computer-generated objects to be perceived as an augmented object positioned within the real-world, by a user of the HMD. In accordance with embodiments described herein, the display component 220 can comprise a see-through display (e.g., a waveguide), a virtual retinal display, prisms, projectors, any other photonic and/or non-photonic technologies operable to facilitate a mixed-reality experience for a user.

In some embodiments, the HMD 210 includes collaborative view components 270 that can be employed to facilitate an intuitive and non-obtrusive exchange of collaborator views and/or statuses without necessitating clarification and/or interrupting the collaborative workflow. Moving now to FIG. 3, a block diagram is provided showing an example implementation of collaborative view components 270 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The collaborative view components 270 can include a set of request-generating components 310 and a set of request-processing components 330. As noted herein, it is contemplated that at least two HMDs participating in a collaborative workflow includes at least some variation of the described collaborative view components 270.

For purposes of clarity and ease of explanation, the request-generating components 310 will now be described in conjunction with the "first" HMD described herein above, while the request-processing components 330 will be described in conjunction with the "second" HMD also described herein above. However, it is noted that both sets of components 310, 330 can be implemented in each of the first and second HMDs participating in a collaborative environment.

As was described, embodiments described herein can detect an interaction from a first HMD and a second HMD that are both configured as collaborative participants of a shared dataset or subset thereof represented in an augmented reality environment. Each HMD must have concurrent authorized access to the shared dataset in order to be considered as active collaborative participants. The term "collaborative participant" is thus used interchangeably herein with reference to a HMD having authorized access to the shared dataset. As described, authorized access can be determined based on authentication of each HMD by a server, such as server 140, or in some other embodiments, based on authenticated access to the visual data stored in a memory of the HMD or a memory of another HMD.

Requesting a Collaborative Participant State

Before the interaction is detected, each active collaborative participant may be able to determine a relative location of another active collaborative participant in accordance with some embodiments described herein. The collaborator locating component 312 can be employed to determine the presence, and in some instances, the precise location of another active collaborative participant. In some embodiments, each active collaborative participant can actively report its own determined viewing placement to other active collaborative participants and/or a server, such as server 140, or passively report its own determined viewing placement to other requesting active collaborative participants and/or a requesting server in response to a location request communicated thereby. In some embodiments, the server can distribute the received viewing placements of active collaborative participants to other active collaborative participants to facilitate interaction detections there between. In some other embodiments, an active collaborative participant can detect the presence of another active collaborative participant based on a line-of-sight detection of the other active collaborative participant. Line-of-sight detection can be facilitated utilizing various technologies configured on active collaborative participants, including infrared blasters and detectors, object recognition from obtained video feeds by optic components (e.g., cameras), and the like.

In some alternative embodiments, relative locations can be communicated between active collaborative participants. For instance, in accordance with some embodiments, an active participant can be an avatar or virtual representation of another active participant in a remote location. In this regard, a relative location of that user can be communicated to other active participants such that their "virtual" location can be interpreted in the same manner as if they were physically located within the same real-world environment. It is also contemplated that various implementations can be employed, such that directed interactions are not necessary, and other means of initiating an interaction can be utilized. For instance, a simple user input (e.g., gesture, voice prompt, device input) may initialize an interaction with another active participant. Location of other active participants can be implemented in a variety of manners, such as a 2D mapping of all active participants, a listing of active participants, and the like.

When the collaborator locating component 312 determines the relative location of another active participant, the collaborative interaction sensing component 314 can be employed to determine whether a collaborative interaction is intended for the other active participant. By way of example, after the first HMD obtains the relative location of the second HMD, utilizing collaborator locating component 312, the collaborative interaction sensing component 314 of the first HMD can employ various methods to determine that a collaborative interaction is directed to the second HMD.

In some embodiments, a gaze by the first HMD directed to the second HMD can be detected by the collaborative interaction sensing component 314. That is, in some embodiments, when a gaze indicator or other displayed focal point, typically positioned in the center of an augmented view presented by the first HMD, is determined to coincide with the location of the second HMD or a user thereof, and the gaze indicator is maintained on the location for a duration exceeding a predetermined threshold, the collaborative interaction sensing component 314 can determine that a collaborative interaction from the first HMD directed to the second HMD was intended. In various other embodiments, a detected instruction to initiate a collaborative interaction by the first HMD directed to the second HMD can be detected by the collaborative interaction sensing component 314. The detected instruction can include a recognized voice command, a detected user motion, or other user input means. Such interactions can be detected as the second HMD is within focus (e.g., positioned substantially within a vertical plane) with the gaze indicator, in accordance with some embodiments. As noted herein, it is further contemplated that any other method for initiating an interaction can be employed, and a server or second HMD can detect the interaction via a collaborative interaction sensing component 314 based on the detected interaction. It is further contemplated that after detecting an instruction to initiate the collaborative interaction, the second HMD can be provided with an alert and/or acceptance prompt to allow and/or facilitate the collaborative interaction with other HMDs.

The collaborative view retrieval component 316 can receive, from the collaborative interaction sensing component 314, an indication that a collaborative interaction was established between the first and second active collaborative participants. As the first collaborative participant initiated the collaborative interaction, its collaborative view retrieval component 316 can generate, responsive to the indication, a request for a set of visual data that corresponds to a current state of the second collaborative participant. The collaborative view retrieval component 316 can employ the communication component, such as communication component 260 of FIG. 2, to transmit the request to the second collaborative participant.

As will be described, the request-processing component 330 of the second collaborative participant can receive and process the transmitted request, and in response, transmit a set of visual data corresponding to a state of the second collaborative participant. The collaborative view retrieval component 316 can receive the set of visual data, and employ processor(s), such as processor(s) 240 of FIG. 2, in conjunction with the collaborative view positioning component 318, to render the received set of visual data for 3D display.

The collaborative view positioning component 318 of the first collaborative participant can employ the processor(s) to render the received set of visual data in a display position that corresponds to at least the position of the second collaborative participant. That is, the collaborative view positioning component 318 can position the rendered set of visual data so that it does not obstruct the first collaborative participant user's view of the second collaborative participant user. In a preferred embodiment, the collaborative view positioning component 318 will position the rendered set of visual data above the second collaborative participant user, which can be conceptually analogized to a speech bubble that appears above the second collaborative participant user. It is contemplated, however, that the rendered set of visual data can be positioned anywhere that corresponds to the second collaborative participant user, such that, for instance, the image does not obstruct a clear view of the second collaborative participant user. As noted, it is contemplated that other types of sensory information, such as sounds, haptics, smells, and other sensory inputs can all be affected by a corresponding position of the rendered set of visual data.

Processing a Collaborative Participant State Request

The second collaborative participant can employ the request-processing components 330 to receive, process, and respond to a request received from and transmitted by the first collaborative participant described herein. The second collaborative participant can employ a request receiving component 332, which receives the request from the first collaborative participant, via the second collaborative participant's communication component, such as communication component 260 of FIG. 2.

In some embodiments, the second collaborative participant can determine that the request was received from a collaborative participant. That is, a collaborator verification component 334 can process a query, including metadata associated with the request and corresponding to the requesting first collaborative participant. The metadata can include, among other things, a unique identifier, a password or encrypted version thereof, a reference to the shared dataset, or any other set of information that can be employed to determine that the requesting first collaborative participant has been authorized to access the shared dataset and is thereby an active collaborative participant. In some embodiments, the collaborator verification component 334 can validate the requesting first collaborative participant by communicating a generated authorization request to the server, such as server 140 of FIG. 1. In some other embodiments, the collaborator verification component 334 can validate the requesting first collaborative participant locally, utilizing stored credentials or other validating information stored thereon.

In some embodiments, the second collaborative participant can process the request by employing a privacy policy filtering component 336 to determine an access level associated with the requesting first collaborative participant. The privacy policy filtering component 336 can reference a locally or server-stored privacy policy to determine an access level associated with the received request. In various embodiments, the privacy policy can enforce a limit on the amount and/or type of visual data, or a subset thereof, that is transmitted to the requesting first collaborative participant in response to the received request. For instance, the privacy policy can the determine whether a current augmented view of the second collaborative participant, a status of the augmented view (e.g., zoom level, position, orientation, depth, angle) of the second collaborative participant, a status associated with the second collaborative participant, a stored copy of any of the foregoing, descriptive notes, and/or any combination or variation thereof, are accessible to the requesting first collaborative participant. In various embodiments, the privacy policy can be global, group based, and/or device/user-specific based on the metadata associated with the received request. In some embodiments, the privacy policy can serve as an age-restrictive policy that can enforce a limit on the amount and/or type of visual data that is transmitted to the requesting first collaborative participant based on their age, which is typically associated with their profile information.

In some embodiments, the privacy policy can be modified upon the second collaborative participant receiving the request. For instance, a prompt may be presented to the second collaborative participant, indicating that the first collaborative participant is requesting a collaborative interaction. The prompt can request acceptance of the interaction, a modification of various aspects of an applicable privacy policy, a rejection of the interaction, and more. In some further embodiments, it is contemplated that the privacy policy can be changed even after collaboration between users has begun. For instance, any collaborative participant may request additional (or restricted) viewing privileges for a particular user by speaking a request, and similarly, the request may be accepted or denied by the particular user by speaking an answer in the affirmative or negative. In another instance, a collaborative participant may unilaterally set additional (or restrictive) privileges for a particular user in the same interactive manners described herein. Other interactive methodologies, including gestures, physical inputs, physical touches, physical exchanges, and the like, are also considered within the purview of the present disclosure.

The privacy policy filtering component 336 can then provide a visual dataset generation component 338 with a determined access level associated with the requesting first collaborative participant, or in some embodiments, the data that corresponds to the determined access level. The visual dataset generation component 338 can generate a set of visual data that is in compliance with the determined access level associated with the requesting first collaborative participant. For instance, if the determined access level associated with the requesting first collaborative participant only allows descriptive notes associated with the state of the second collaborative participant, then only the descriptive notes that semantically describe the state (e.g., status, augmented view) can be included into the generated set of visual data for communication to the requesting first collaborative participant. The set of visual data can include all accessible state information associated with the second collaborative participant, or can include a portion of the accessible state information, in accordance with the access level determined by privacy policy filtering component 336.

The set of visual data generated by visual dataset generation component 338 can then be communicated to the requesting first collaborative participant by employing the visual dataset sharing component 340. The visual dataset sharing component 340 can employ a communication component, such as communication component 260 of FIG. 2, to transmit the generated set of visual data to the requesting first collaborative participant in response to the received request. In this way, the requesting first collaborative participant can view the state of the second collaborative participant based on its directed interaction therewith.

Figure 4A:
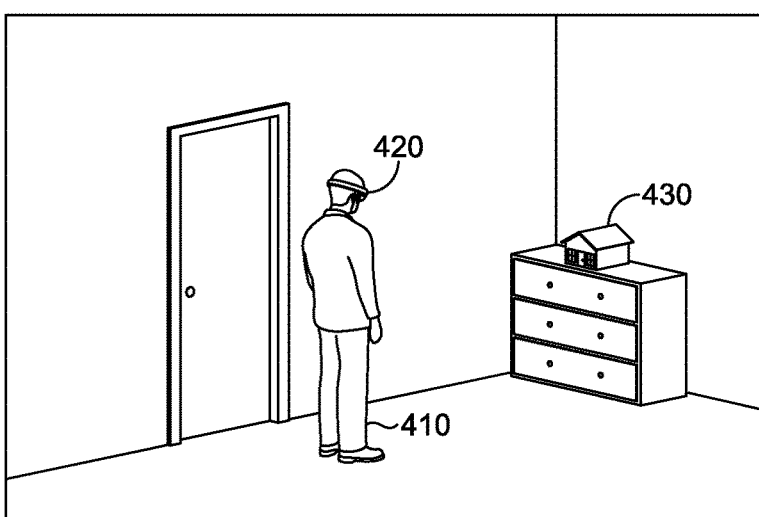
FIGS. 4A-4C are schematics of exemplary implementations of intuitive collaboration on visual data in an augmented reality environment, in accordance with some embodiments of the present disclosure.
Figure 4B:
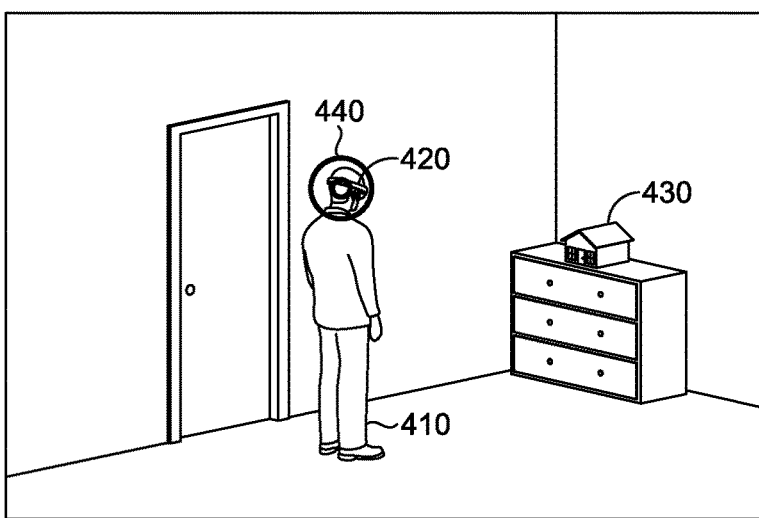
Figure 4C:
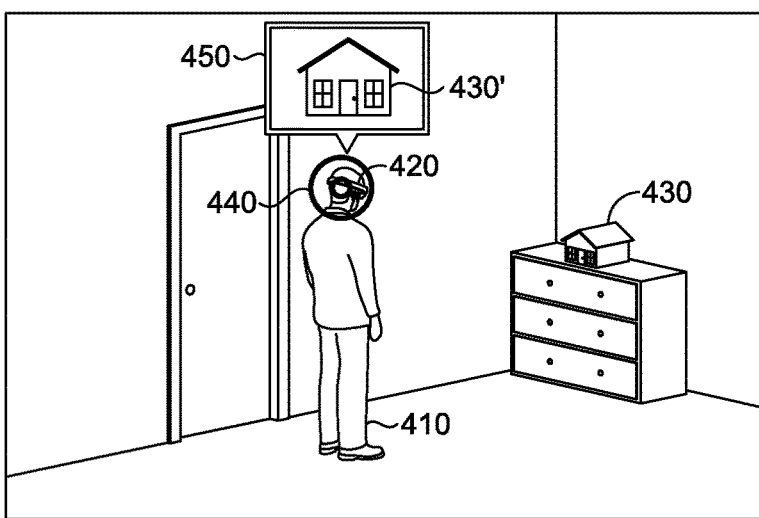

Turning now to FIGS. 4A-4C, schematics of exemplary implementations of intuitive collaboration on visual data in an augmented reality environment are provided. Looking at 400A of FIG. 4A, a first augmented view perceived by a first user associated with a first HMD accessing a shared dataset (e.g., a first collaborative participant) is depicted. The first user can see a second user 410 wearing a second HMD 420 that is also accessing the shared dataset (e.g., a second collaborative participant). In accordance with embodiments described herein, the first user can also perceive, in the first augmented view, a computer-generated object 430 resembling a miniature house, which appears to be positioned on top of a dresser.

Looking now at first augmented view 400B of FIG. 4B, a gaze indicator 440 is displayed within the first augmented view by the first collaborative participant, and corresponding to a detected viewing placement of the first collaborative participant in accordance with an embodiment described herein. That is, the first user is positioning and orienting the first collaborative participant to align its displayed gaze indicator 440 to correspond to the second collaborative participant 420.

Assuming that either a threshold duration or other instruction to collaboratively interact with the second collaborative participant 420 is detected by the first collaborative participant, while the gaze indicator 440 is positioned in substantial alignment with the second collaborative participant 420 and/or user 410, the first augmented view of the first user is thereby augmented, as depicted in the first augmented view 400C of FIG. 4C, with the computer-generated object 430' that is currently being rendered by the second collaborative participant 420 and perceived in a second augmented view of the second user 410. In some embodiments, the computer-generated object 430' can be framed within a computer-generated boundary image 450, such as a speech-bubble or other non-limiting shape.

Figure 5A:
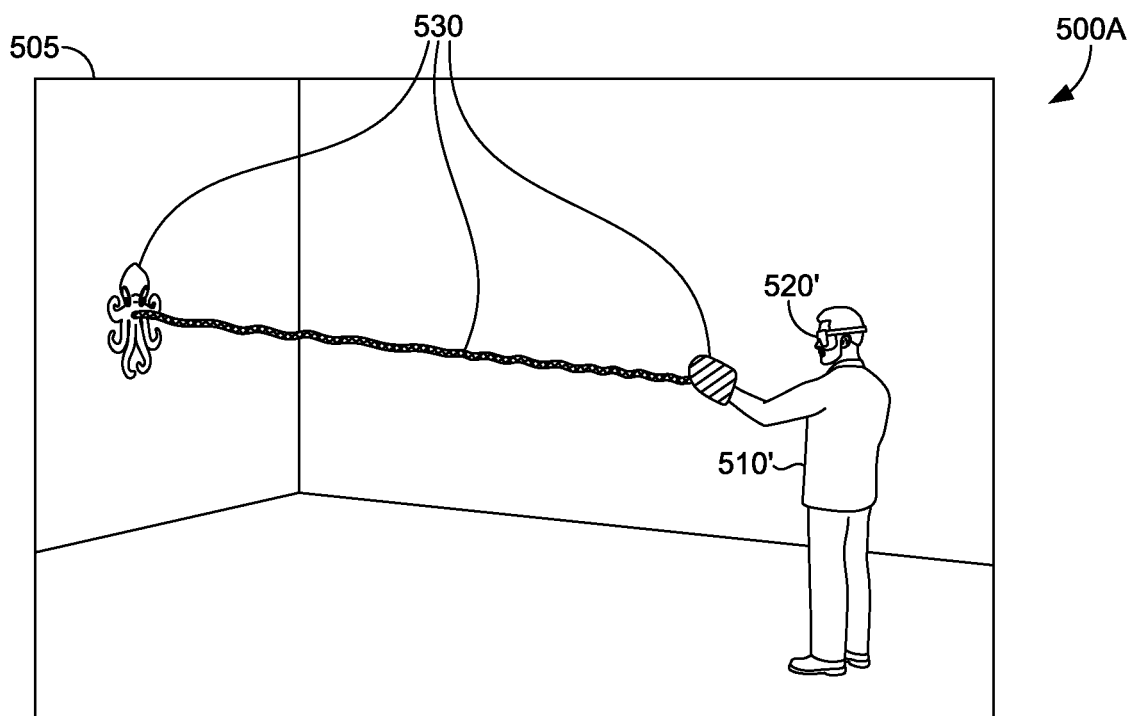
FIGS. 5A-5D are schematics of exemplary implementations of intuitive collaboration on visual data in an augmented reality environment, in accordance with some embodiments of the present disclosure.
Figure 5B:
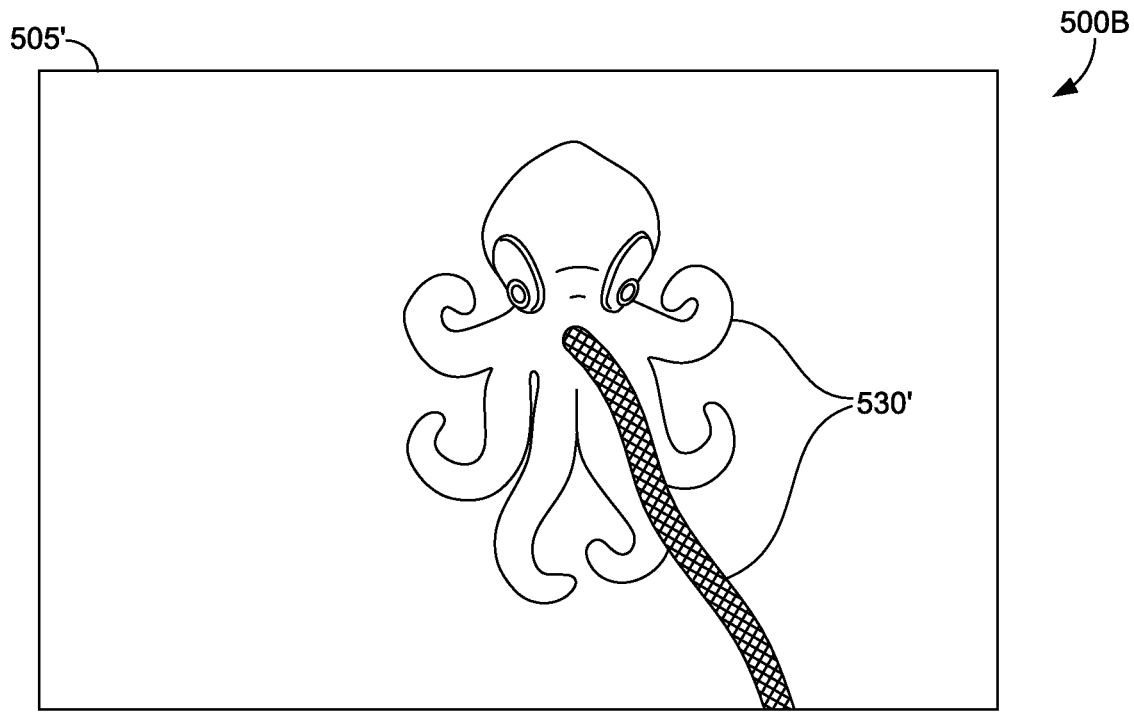
Figure 5C:
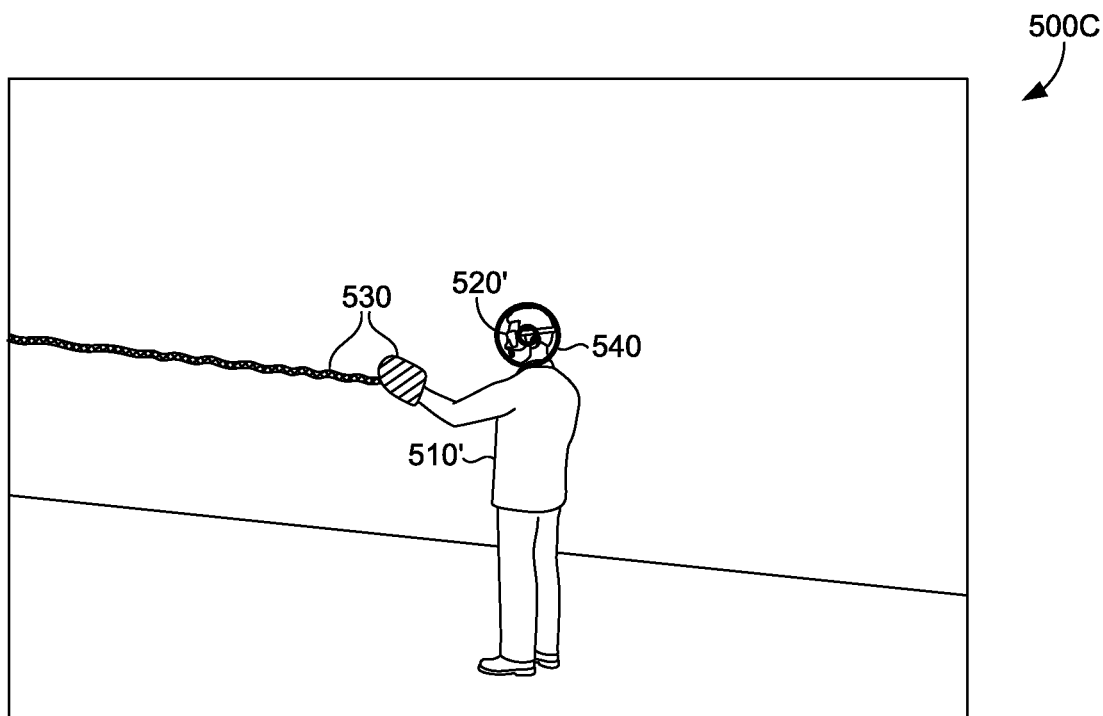

Turning now to FIGS. 5A-5C, more schematics of exemplary implementations of intuitive collaboration on visual data in an augmented reality environment are provided in accordance with an embodiment described herein. In the illustrated schematics, an augmented reality game supporting multiple players is depicted. In the illustrated example, the shared dataset corresponds to various computer-generated objects that provide a live-action gaming scenario within the real-world environment. Looking at 500A of FIG. 5A, a first augmented view 505 perceived by a first user associated with a first HMD accessing the shared dataset (e.g., a first collaborative participant) is depicted. The first user can see a second user 510' wearing a second HMD 520' that is also accessing the shared dataset (e.g., a second collaborative participant). In accordance with embodiments described herein, the first user can also perceive, in the first augmented view 505, computer-generated objects 530 resembling a flying alien, a weapon configured on the hand of the first user 510', and a laser beam extending from the computer-generated weapon and targeting the alien.

Looking now at 500B of FIG. 5B, a second augmented view perceived by the second user associated with the second collaborative participant is depicted. Here, the second user can perceive, in at least a portion 505' of the second augmented view 500B, the computer-generated objects 530' rendered in accordance with their viewing placement within the real-world environment. In other words, the unique perspective of the second user can provide a unique augmented view 505' that coincides with the position and/or orientation of the second HMD 520' accessing the shared dataset.

Looking now at first augmented view 500C of FIG. 5C, a gaze indicator 540 is displayed within the first augmented view by the first collaborative participant, and corresponding to a detected viewing placement of the first collaborative participant. That is, the first user is positioning and orienting the first collaborative participant to align its displayed gaze indicator 540 to correspond to the second collaborative participant 520'.

Figure 5D:
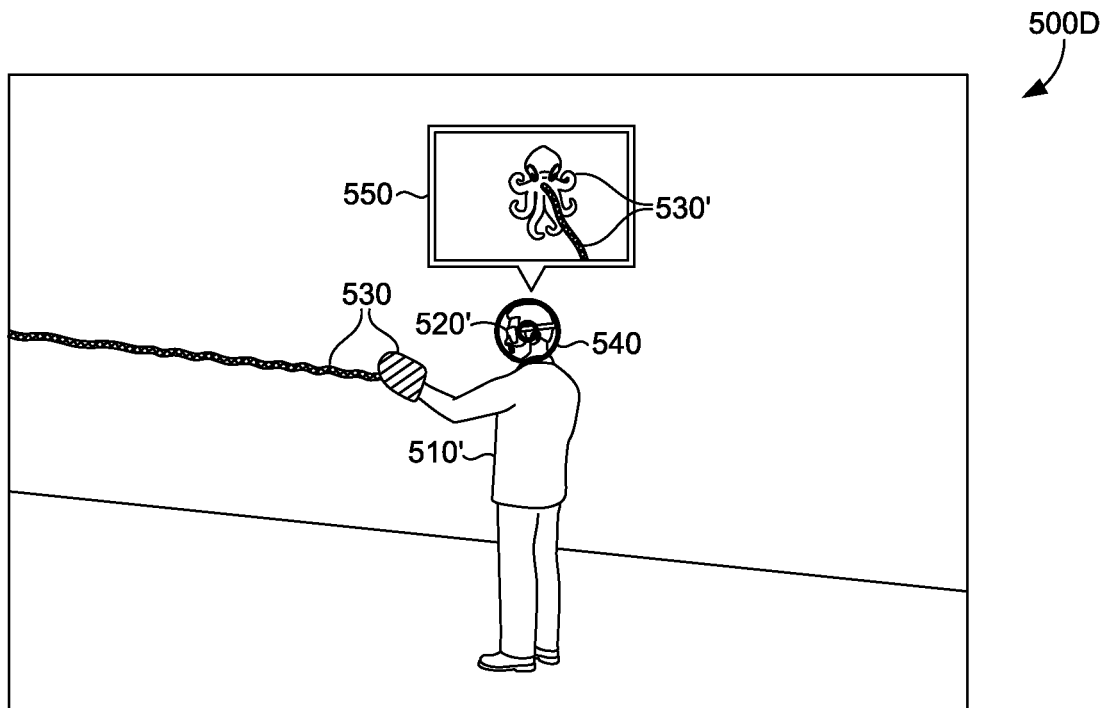

Assuming that either a threshold duration or other instruction to collaboratively interact with the second collaborative participant 520' is detected by the first collaborative participant, while the gaze indicator 540 is positioned in substantial alignment with the second collaborative participant 520' and/or user 510', the first augmented view of the first user is thereby augmented, as depicted in first augmented view 500D of FIG. 5D, with the computer-generated objects 530' that are concurrently being rendered by the second collaborative participant 520' and perceived in the second augmented view 500B of FIG. 5B of the second user 510'. In some embodiments, the computer-generated objects 530' can be framed within a computer-generated boundary image 550, such as a speech-bubble or other non-limiting shape.

Figure 6:
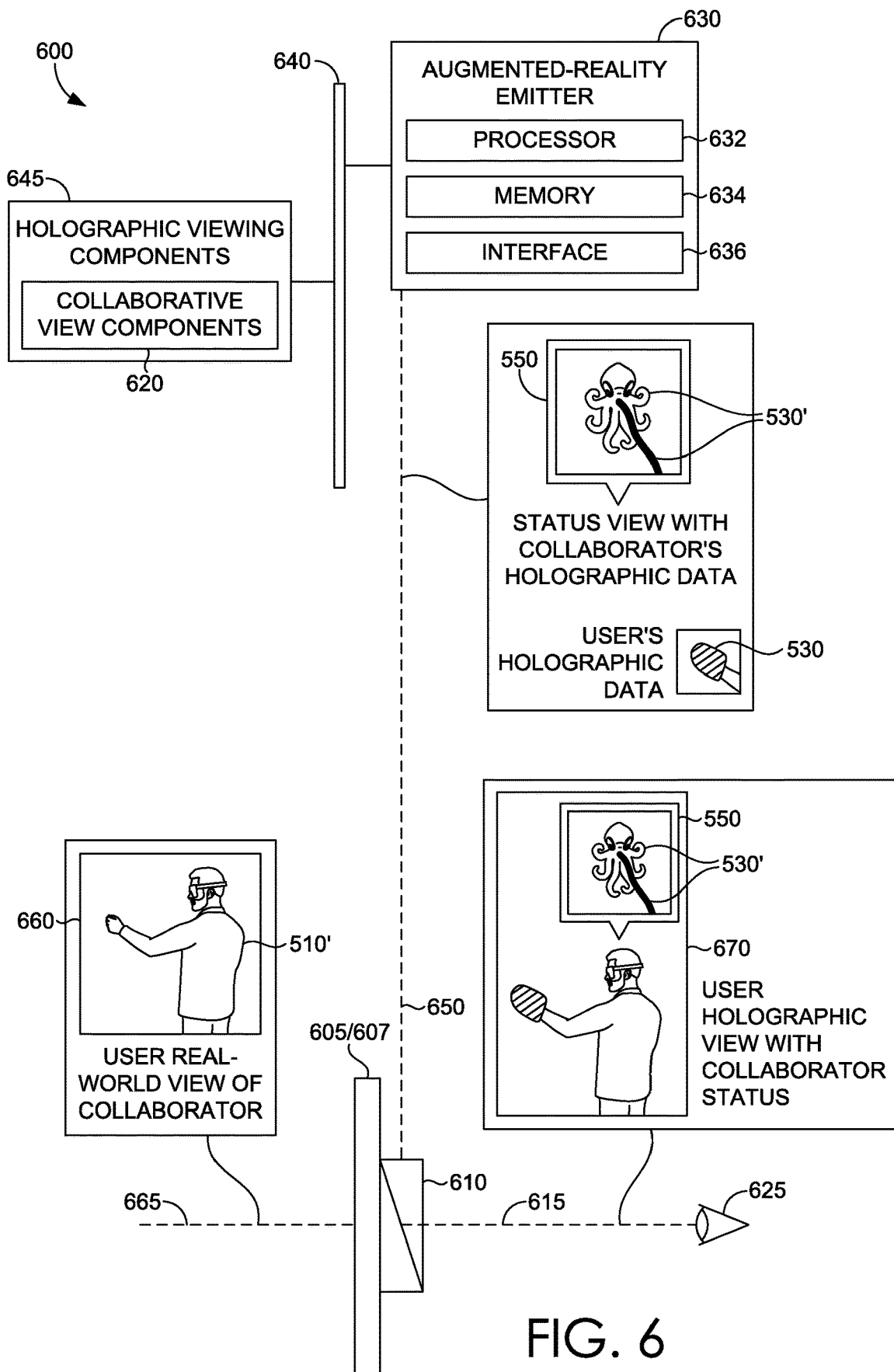
FIG. 6 is a block diagram of an exemplary HMD, in accordance with some embodiments of the present disclosure.

Turning to FIG. 6, a HMD 605 having collaborative viewing components 620 is described in accordance with an embodiment described herein. The HMD 605 includes, among other things, a see-through lens 607 which is placed in front of a first user's eye 625, similar to an eyeglass lens. It is contemplated that a pair of see-through lenses 607 can be provided, one for each eye 625. The lens 607 includes an optical display component 610, such as a beam splitter (e.g., a half-silvered mirror). The HMD 605 includes an augmented-reality emitter 630 that facilitates altering the brightness of computer-generated AR images. Amongst other components not shown, the HMD 605 also includes a processor 632, memory 634, interface 636, a bus 640, and additional augmented viewing components 645. The augmented-reality emitter 630 emits light representing one or more augmented-reality images 530, 530', 550 exemplified by a light ray 650. Light from the real-world scene 660, such as a light ray 665, reaches the lens 607. Additional optics can be used to refocus the augmented-reality images 530, 530', 550 so that they appears to originate from several feet away from the eye 625 rather than one inch away, where the display component 610 actually is. The memory 634 can contain instructions which are executed by the processor 632 to enable the augmented-reality emitter 630 to perform functions as described. One or more of the processors 632 can be considered to be control circuits. The augmented-reality emitter 630 communicates with the additional augmented viewing components 645 using the bus 640 and other suitable communication paths.

Other arrangements and elements (e.g., machines, interfaces, functions, orders, and groupings of functions, etc.) can be used in addition to or instead of those shown, and some elements may be omitted altogether. For instance, the HMD may be configured such that the real-world and/or augmented scene is not perceived through a see-through lens, but rather on a display presenting a video feed captured via one or more optical devices (e.g., video cameras). Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented-reality images 530, 530', 550 are reflected by the display component 610 toward a first user's eye, as exemplified by a light ray 615, so that the first user sees an image 670. In the image 670, a portion of the real-world scene 660, such as, a second user 510' wearing a second HMD is visible along with all augmented-reality images 530, 530', 550, such as the alien, weapon, and laser beam. The first user can therefore see a mixed-reality image 670 in which the second user 510' is holding the weapon, and a 3D status view 550 including the alien and laser beam, from with the second HMD, is floating above the second user's head in this example.

Figure 7:
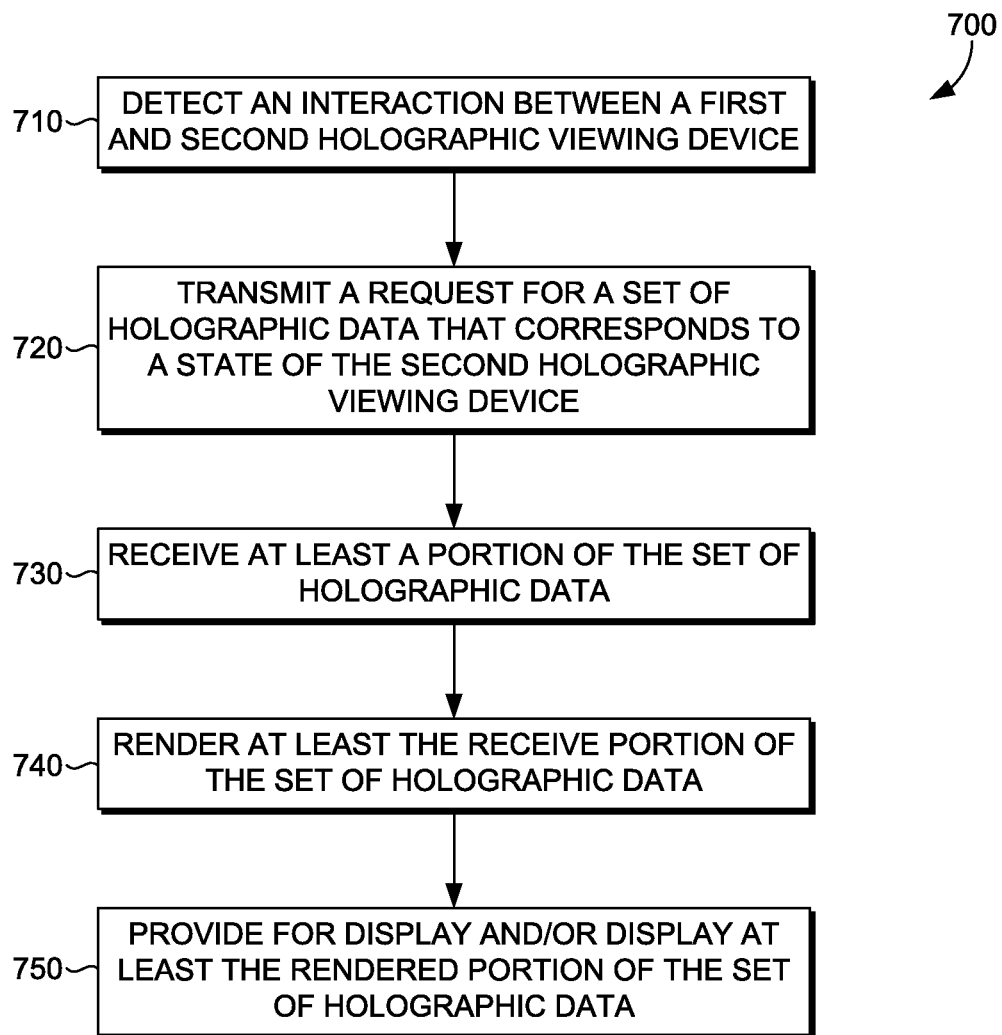
FIG. 7 is a flow diagram showing a method for facilitating intuitive collaboration on visual data in augmented reality environments, in accordance with some embodiments of the present disclosure.

Turning now to FIG. 7, a flow diagram is provided illustrating one example method 700 for facilitating intuitive collaboration on visual data in an augmented reality environment. The following method can be performed by any HMD accessing a shared dataset concurrently with another HMD, in accordance with some embodiments of the present disclosure. The following method utilizes the term "first HMD" in reference to the HMD that is performing the method, in accordance with an embodiment of the present disclosure. Utilization of this term is not intended to be limiting, however, and any reference to a HMD performing the method can be employed in accordance with embodiments described herein. However, it is contemplated that each block or step of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 710, an interaction is detected between a first HMD and a second HMD. In some embodiments, the first and second HMDs must be concurrently accessing a shared dataset, of which the first and second HMDs have authorized access to. The HMDs can be in direct communication with one another via a network, and/or can be in coupled communication via a server, such as server 140 of FIG. 1. In some embodiments, the interaction can be detected by the first HMD, based on one or more detected conditions. For instance, a focused gaze directed to the second HMD, and exceeding a predetermined threshold duration, can trigger a detection of a collaborative interaction by the first HMD to the second HMD. It is contemplated that any combination of conditions described herein can be detected by the first HMD to determine a collaborative interaction. In another instance, the server can detect the interaction by the first HMD directed to the second HMD, based on one or more of the detected conditions described herein. In some embodiments, communications from the first HMD to the second HMD or the server can include viewing placement information, that can be employed by the second HMD or the server to determine if the first HMD is directing a collaborative interaction to the second HMD (e.g., for at least a threshold duration). In some other embodiments, a mutual gaze between the first and second HMD may be required to trigger the detection of a collaborative interaction between the first and second HMD. In some instances, the second HMD may be required to acknowledge or accept the collaborative interaction request from the first HMD.

At step 720, a request for a set of visual data that corresponds to a state of the second HMD is generated by the first HMD and transmitted to the second HMD. In some embodiments, the request can be a general request, including a request for all available state information associated with the second HMD. In some other embodiments, the request can be a specific request, including a request for one or more types of state information associated with the second HMD. For instance, a specific request may include a request for, among other things, battery life, active application, status, current user face expression, a current augmented view, a stored augmented view, descriptive notes thereof, or any other state information associated with the second HMD to which the request is directed to.

In some embodiments, the request can be transmitted to the second HMD directly from the first HMD. In some other embodiments, the request can be transmitted by the first HMD to the second HMD via a network, such as network 130 of FIG. 1, or in another embodiment, via a server, such as server 140 of FIG. 1. In various embodiments, communications between the HMDs can be facilitated via their respective communication components, such as communication component 260 of FIG. 2.

At step 730, the first HMD can receive at least a portion of the requested set of visual data from the second HMD of which the request was directed to. As described herein, the received set of visual data can be the entire requested set of visual data, or a portion of the requested set of visual data. The received set of visual data is generated by the second HMD based on a privacy policy referenced by the second HMD, in accordance with some embodiments described herein. The generated set of visual data is communicated by the second HMD to the requesting first HMD, in response to the received request.

At step 740, the first HMD can process and/or render the received set of visual data. In some embodiments, the first HMD can determine, among other things, a position or relative position of the second HMD from which the set of visual data was received. As described herein, the position or relative position of the second HMD can be included in the viewing placement of the second HMD, which is obtained and/or determined by the first HMD employing a collaborator locating component, such as collaborator locating component 312 of FIG. 3. The first HMD can determine rendering coordinates (e.g., a vertical position, horizontal position, depth) for positioning the computer-generated object(s) that are based on the received set of visual data. In some embodiments, the rendering coordinates are fixed, such that the computer-generated object(s) that are based on the received set of visual data are positioned above the second HMD, and thereby above the head and face of the user of the second HMD in an unobstructed manner In some further embodiments, the computer-generated object(s) based on the received set of visual data are configured with a computer-generated frame, such as a speech bubble, by way of example. In some other embodiments, the rendering coordinates can position the received set of visual data adjacent to, overlapping, below, or any other position relative to the second HMD.

At step 750, the first HMD can provide for display and/or display the received set of visual data. That is, the first HMD can employ a display component, such as display component 220 of FIG. 2, to display the computer-generated object(s) based on the received set of visual data in its determined rendering position. In accordance with embodiments described herein, the computer-generated object(s) based on the received set of visual data can be added (e.g., augmented) to or replace (e.g., a switched view) any existing computer-generated object(s) that may already be rendered and provided for display by the first HMD. In embodiments, the computer-generated objects are presented as augmented reality objects, such that the computer-generated objects are perceived to coexist with the real-world environment perceived by the user of the first HMD. It is further contemplated that in some embodiments, once a collaborative interaction is enabled between the first and second HMD, the first HMD can maintain a display of the set or subset of visual data, either within their FOV, or relative to the location of the second HMD. It is further contemplated that the initiation of a collaborative interaction would also automatically facilitate the mutual exchange of visual data, such that the first and second HMDs can mutually receive and view each other 's' sets or subsets of visual data.

Figure 8:
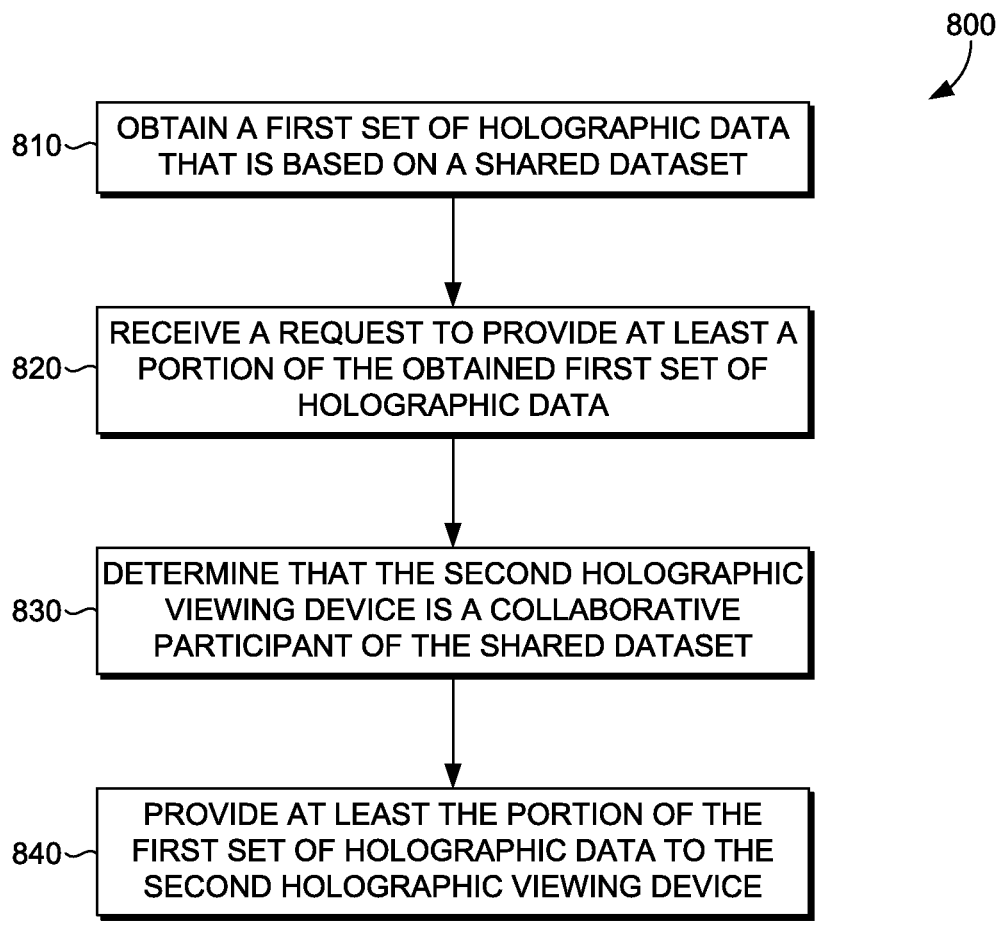
FIG. 8 is a flow diagram showing a method for facilitating intuitive collaboration on visual data in augmented reality environments, in accordance with some embodiments of the present disclosure.

With reference now to FIG. 8, a flow diagram is provided illustrating another example method 800 for facilitating intuitive collaboration on visual data in an augmented reality environment. The following method can be performed by any HMD accessing a shared dataset concurrently with another HMD, in accordance with some embodiments of the present disclosure. The following method utilizes the term "second HMD" in reference to the HMD that is performing the method, in accordance with an embodiment of the present disclosure. Utilization of this term is not intended to be limiting, however, and any reference to a HMD performing the method can be employed in accordance with embodiments described herein. However, it is contemplated that each block or step of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 810, the second HMD can obtain a first set of visual data that is based at least in part on a shared dataset that is accessible to at least the second HMD and a first HMD located within physical proximity (e.g., within a common real-world environment or room) or virtualized proximity (e.g., an avatar virtually located within the common real-world environment or room) of the second HMD. In accordance with some embodiments described herein, the second HMD can store the first set of visual data in a memory or cache thereof, and/or can communicate (e.g., stream) the first set of visual data for storage in a remote memory or cache (e.g., a server memory or another HMD memory). In some embodiments, the obtained first set of visual data includes state information associated with the second HMD. In accordance with embodiments described herein, the state information can include any information associated with a current state, previous state, current augmented view, or previous augmented view, associated with the second HMD. In some embodiments, the obtained first set of visual data comprises at least the current augmented view that is currently rendered, currently provided for display, or currently displayed by the second HMD. In other words, a real-time stream including a current frame of the augmented view provided for display by the second HMD can be obtained and stored thereby.

At step 820, the second HMD can receive, from the first HMD, a request to provide the first HMD with state information associated with the second HMD. The request can be transmitted by the first HMD, and received by the second HMD, employing their respective communication components, such as communication component 260 of FIG. 2. As described, the requested state information can correspond to the obtained first set of visual data in accordance with embodiments described herein.

The received request can be processed by the second HMD, at step 830, to determine that the requesting first HMD is authorized to access the obtained first set of visual data. In some embodiments, the second HMD can make the determination by verifying that the first HMD is a collaborative participant of the shared dataset. For instance, the second HMD can employ metadata associated with the received request, and compare the metadata with an authorized collaborative participant list stored in memory. In another instance, the second HMD can communicate the metadata to a server, such as server 140 of FIG. 1, to perform the comparison as described. In some other instances, the mere fact that the first HMD was able to communicate with the second HMD is sufficient to verify access to the obtained first set of visual data. It is contemplated that any form of access verification between two user devices, such as the first and second HMDs, accessing a shared dataset can be employed within the purview of the present disclosure. Any one of the HMDs, and/or a server, can be employed by any component of the system described herein to facilitate the access verification.

In some embodiments, the second HMD can reference a privacy policy locally or remotely stored (e.g., on a server), to determine an appropriate amount of the obtained first set of visual data that can be shared in response to the received request. In some instances, the privacy policy can indicate full access to the obtained first set of visual data. In some other instances, the privacy policy can indicate limited or restricted access to the obtained first set of visual data. In some further embodiments, the privacy policy can dictate access levels that are specific to a user profile, unique identifier (e.g., hardware identifier), group identifier, or any other characteristic associated with and included in the metadata of the request. In some embodiments, the second HMD can generate a specific set of visual data that is responsive to the request, in accordance with the corresponding privacy policy.

At step 840, the second HMD can provide the generated set of visual data to the requesting first HMD. As described herein, the second HMD can provide the generated visual data to the requesting first HMD directly and/or via a network, employing respective communication components configured thereon. As described herein, and in accordance with some embodiments, the generated set of visual data can only be communicated to the first HMD when the first HMD is determined to be an active collaborative participant of the shared dataset. Moreover, in accordance with further embodiments, the generated set of visual data can be a limited set of visual data, that is generated in accordance with a privacy policy referenced by the second HMD. In this way, collaborative interactions between active collaborative participants in a collaborative AR environment can be intuitive and secure, so as to maintain privacy in accordance with a defined scope of access.

Accordingly, various aspects of technology for facilitating intuitive collaboration on visual data in an augmented reality environment are described. It is understood that various features, sub-combinations, and modifications of the embodiments described herein are of utility and may be employed in other embodiments without reference to other features or sub-combinations. Moreover, the order and sequences of steps shown in the example methods 700 and 800 are not meant to limit the scope of the present invention in any way, and in fact, the steps may occur in a variety of different sequences within embodiments hereof. Such variations and combinations thereof are also contemplated to be within the scope of embodiments of the invention.

Figure 9:
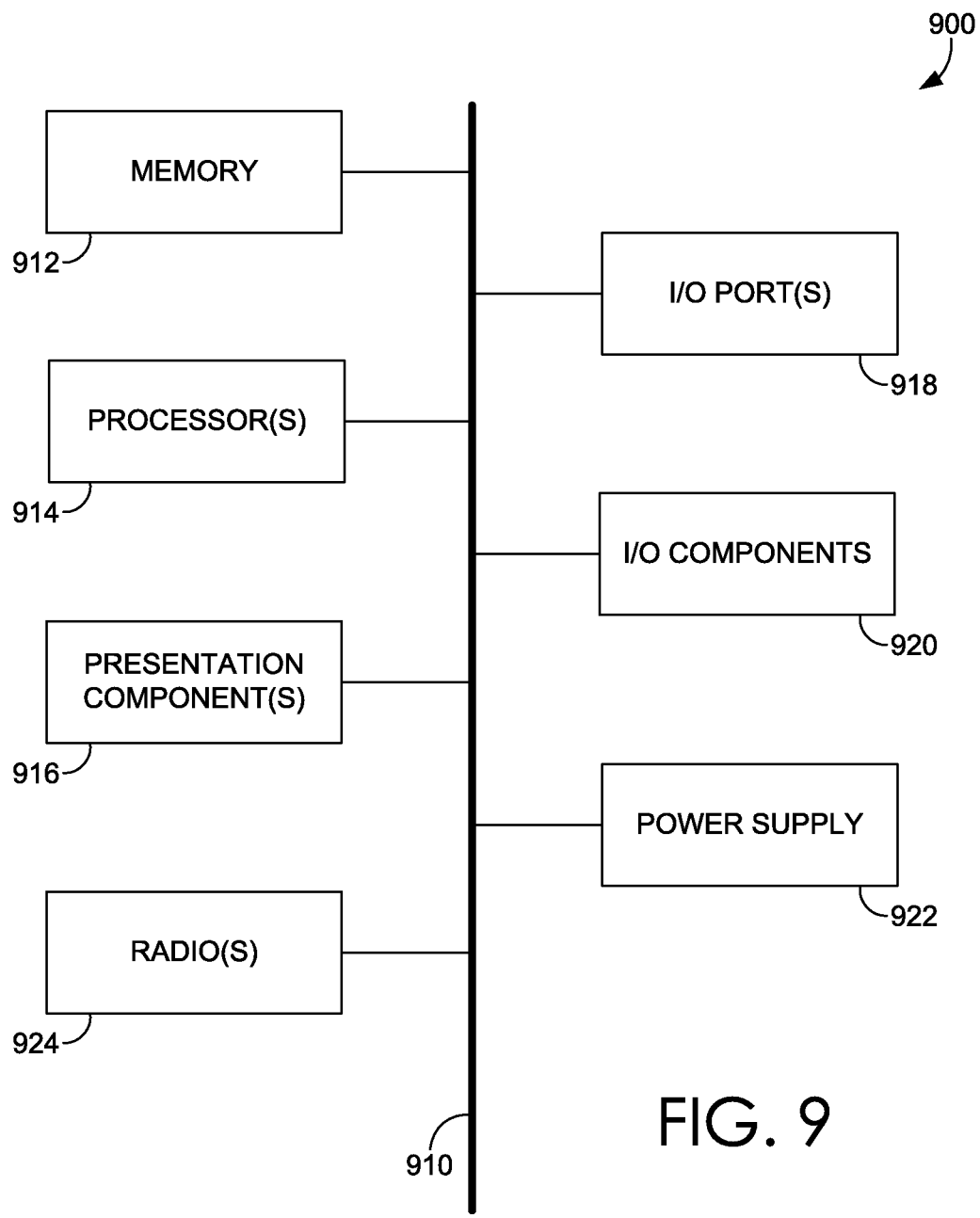
FIG. 9 is a block diagram of an exemplary computing environment suitable for use in implementing embodiments of the present invention.

Having described various embodiments of the invention, an exemplary computing environment suitable for implementing embodiments of the invention is now described. With reference to FIG. 9, an exemplary computing device is provided and referred to generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated. Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more buses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," "headset," head-mounted display," or "HMD," as all are contemplated within the scope of FIG. 9 and with reference to "computing device" or "user device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900 or another computing device and/or input device coupled thereto. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers, gyroscopes, magnetometers, GPS, and the like that enable detection of motion, position, rotation, and/or orientation. The output of the accelerometers, gyroscopes, or magnetometers may be provided to the display of the computing device 900 to render immersive augmented reality, mixed-reality, or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for facilitating intuitive collaboration on visual data in augmented reality environments, the method comprising:

accessing, by a first computing device, a shared dataset of which the first computing device is a first collaborative participant;

rendering, by the first computing device, at least a portion of the shared dataset based on a determined first viewing placement of a first HMD coupled to the first computing device;

providing for display, by the first computing device, at least the rendered portion of the shared dataset to the first HMD, the rendered portion presenting a first view of the shared dataset that corresponds to the determined first viewing placement;

while at least the rendered portion is being displayed by the first HMD, receiving, by the first computing device, a state request that is communicated via a network from a second computing device, the state request being communicated based at least in part on a determined second viewing placement of a second HMD coupled to the second computing device and the determined first viewing placement of the first HMD, wherein the second viewing placement corresponds to a second view of the shared dataset; and communicating, by the first computing device, at least a position and orientation corresponding to the first viewing placement, to the second computing device via the network, in response to the received state request and a determination that the second computing device is a second collaborative participant of the shared dataset, wherein the second computing device is configured to render, based on the communicated position and orientation corresponding to the first viewing placement, at least the portion of the shared dataset such that it matches the first view of the first HMD.

2. The computer-implemented method of claim 1, wherein the second viewing placement corresponds to another position and another orientation of the second HMD.

3. The computer-implemented method of claim 1, further comprising: communicating electronic status information associated with the first computing device and/or the first HMD to the second computing device via the network in response to the received state request and the determination that the second computing device is the second collaborative participant.

4. The computer-implemented method of claim 1, wherein the position and orientation corresponding to the first viewing placement is communicated to cause the second computing device to generate a haptic feedback or audible signal via the second HMD.

5. The computer-implemented method of claim 1 wherein the position and orientation corresponding to the first viewing placement is communicated to cause the second computing device to provide for display, to the second HMD, a transition between a second augmented view and a first augmented view, the second augmented view comprising at least a corresponding portion of the shared dataset that is rendered based on the determined second viewing placement, and the first augmented view comprising the portion of the shared dataset that is rendered based on the communicated position and orientation corresponding to the first viewing placement.

6. The computer-implemented method of claim 3, further comprising:

prior to communicating the electronic status information, filtering, by the first computing device, the electronic status information based on a defined privacy policy associated with the first computing device.

7. A computer storage medium storing computer-useable instructions that, when used by one or more computing devices, cause the one or more computing devices to perform operations for facilitating intuitive collaboration on visual data in augmented reality environments, the operations comprising:

detecting an interaction from a first computing device directed to a second computing device based at least in part on a determined first viewing placement of a first HMD coupled to the first computing device and a determined second viewing placement of a second HMD coupled to the second computing device, the determined first viewing placement corresponding to a first view of a collaborative augmented reality environment and the second viewing placement corresponding to a second view of the collaborative augmented reality environment, wherein the second HMD is displaying at least a portion of a collaborative augmented reality environment that is rendered by the second computing device based on the determined second viewing placement, the rendered portion presenting the second view of the collaborative augmented reality environment;

based at least in part on the detected interaction, transmitting a generated request for a state of the second computing device and/or the second HMD to the second computing device via a network;

receiving, from the second computing device, the second viewing placement of the second HMD via the network responsive to the transmitted request and based on a determination that the first and second computing devices are each associated with the collaborative augmented reality environment, wherein the second viewing placement is received to cause the first computing device to render at least the portion of the collaborative augmented reality environment such that it matches the second view of the second HMD.

8. The medium of claim 7, wherein a semantic description of an electronic state associated with the second computing device is further received from the second computing device responsive to the transmitted request and based on the determination that the first and second computing devices are each associated with the collaborative augmented reality environment, further causing the first computing device to provide for display the received semantic description to the first HMD.

9. The medium of claim 8, wherein the received semantic description is filtered based on a defined privacy policy associated with the second computing device.

10. A system for facilitating intuitive collaboration on visual data in augmented reality environments, the system comprising:

a HMD;

at least one viewing placement sensor; and at least one processor and a memory to provide computer-executable instructions to the at least one processor, wherein the at least one processor is configured to:

employ the at least one viewing placement sensor to determine a first viewing placement of the HMD and a second viewing placement of a remote HMD, wherein the HMD and the remote HMD are within physical proximity to one another;

while a collaborative augmented reality environment is being accessed via the HMD and a first view of the collaborative augmented reality environment corresponding to the first viewing placement is displayed, detect an interaction that is directed to a remote computing device coupled to the remote HMD based at least in part on a determination that a gaze indicator displayed by the HMD at the first viewing placement corresponds to the determined second viewing placement for at least a predetermined threshold;

in response to the detected interaction, transmit, to the remote computing device, a request for a state of the remote computing device and/or the remote HMD via a network, wherein the request is transmitted while the remote HMD is displaying at least a portion of the collaborative augmented reality environment that was rendered by the remote computing device based on the second viewing placement, the portion being displayed on the remote HMD presenting second view of the collaborative augmented reality environment corresponding to the determined second viewing placement;

based on the transmitted request and a determination that the remote computing device is also accessing the collaborative augmented reality environment, receive, from the remote computing device, the second viewing placement of the remote HMD; and render for display to the HMD at least the portion of the collaborative augmented reality environment based on the received second viewing placement such that it matches the second view of the remote HMD.

11. The computer-implemented method of claim 1, wherein the state request is communicated based further on the second HMD having a facing direction that corresponds to a position of the first HMD.

12. The computer-implemented method of claim 1, wherein the second HMD is within a physical proximity of the first HMD.

13. The computer-implemented method of claim 1, further comprising:
communicating, by the first computing device, electronic status data of the first computing device to the second computing device via the network in response to the received state request and the determination that the second computing device is the second collaborative participant, the electronic status data including at least one of a battery level of the first computing device and/or first HMD, a description of applications being executed by the first computing device, or a description of media being played by the first computing device via the first HMD wherein the communicated electronic status data causes the second computing device to provide for display the communicated electronic status data to the second HMD.

14. The medium of claim 7, wherein electronic status data of the second computing device is further received via the network responsive to the transmitted request and based on the determination that the first and second computing devices are each associated with the collaborative augmented reality environment, and wherein the first computing device is further caused to provide for display the received electronic status data to the first HMD.

15. The medium of claim 14, wherein the electronic status data includes at least one of a battery level of the second computing device and/or the second HMD, a description of applications being executed by the second computing device, or a description of media being played by the second computing device via the second HMD.

16. The system of claim 10, wherein a semantic description of the state of the remote computing device and/or remote HMD is further received from the remote computing device based on the transmitted request and the determination that the remote computing device is also accessing the collaborative augmented reality environment, and wherein the received semantic description is further provided for display to the HMD with at least the rendered portion of the collaborative augmented reality environment.

17. The system of claim 16, wherein the state includes a battery level of the remote computing device and/or the remote HMD.

18. The system of claim 16, wherein the state includes at least one application being executed by the remote computing device.

19. The system of claim 16, wherein the state includes a media being played by the remote computing device via the remote HMD.

* * * * *